United States Patent [19]
Ueda

[11] Patent Number: 5,396,236
[45] Date of Patent: Mar. 7, 1995

[54] CONVERTING METHOD OF VERTICAL DATA/HORIZONTAL DATA AND A CIRCUIT THEREFOR

[75] Inventor: Michio Ueda, Osaka, Japan

[73] Assignee: Fujitsu Limited, Kawasaki, Japan

[21] Appl. No.: 20,055

[22] Filed: Feb. 19, 1993

[30] Foreign Application Priority Data

Feb. 19, 1992 [JP] Japan .................................. 4-032199

[51] Int. Cl.$^6$ ............................................. H03M 7/00
[52] U.S. Cl. ..................................... 341/50; 345/126; 382/46; 341/100
[58] Field of Search ......................... 341/50, 100, 101; 365/189.08; 348/583; 345/126; 382/46

[56] References Cited

U.S. PATENT DOCUMENTS

| | | | |
|---|---|---|---|
| 3,129,411 | 4/1964 | Albrecht | 341/100 |
| 4,274,085 | 6/1981 | Marino, Jr. | 341/101 |
| 4,575,708 | 3/1986 | Meyer | 341/50 |
| 4,797,852 | 1/1989 | Nanda | 345/126 |
| 4,837,845 | 6/1989 | Pruett et al. | 382/46 |
| 5,101,202 | 3/1992 | Chaisemartin et al. | 341/100 |
| 5,287,472 | 2/1994 | Horst | 365/189.08 |

OTHER PUBLICATIONS

Ayres, Jr., *Schaum's Outline Series Theory and Problems of Matrices*, © 1962 Schaum's Publishing Co., pp. 10–12.

*Primary Examiner*—Howard L. Williams

[57] ABSTRACT

A converting method and circuit for converting horizontal M-bit data and vertical N-bit data into vertical M-bit data and horizontal N-bit data. A square matrix of M or N whichever the larger is considered, and a part of data are transposed with the diagonal axis as an axis of symmetry. The circuit may be constituted by flip-flops less than the number M×M (N×N) and selectors less than the same number.

3 Claims, 13 Drawing Sheets

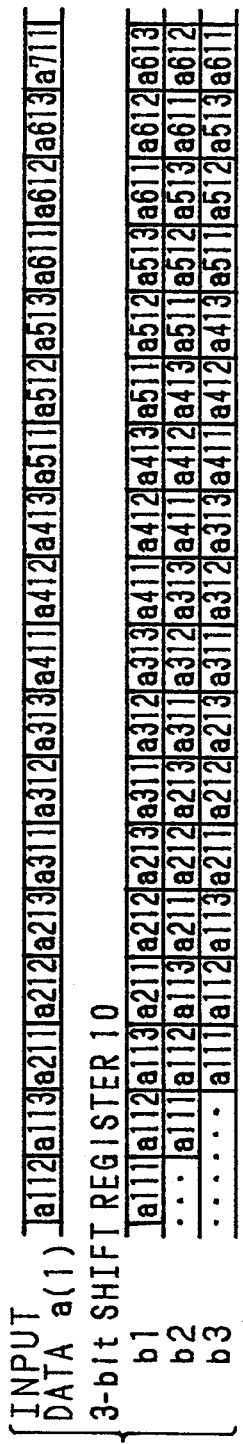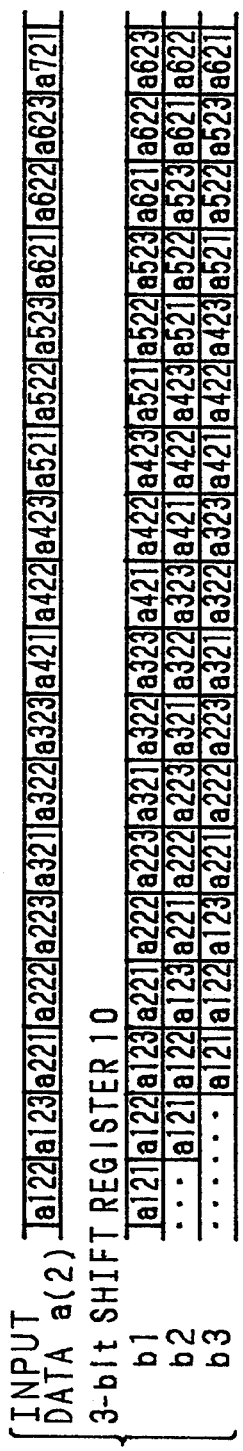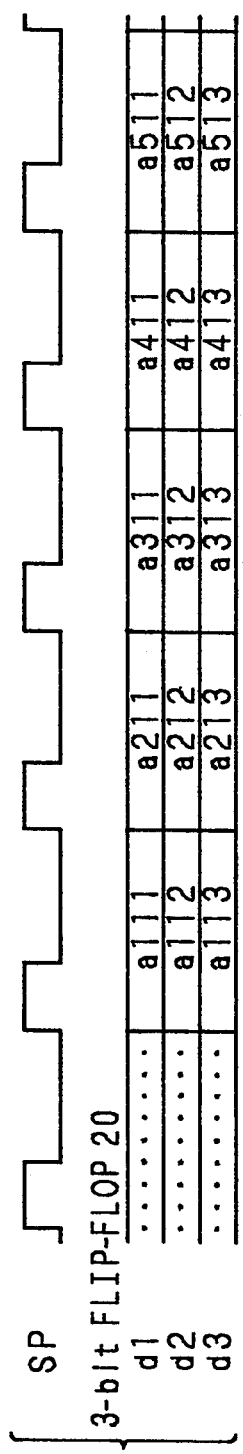

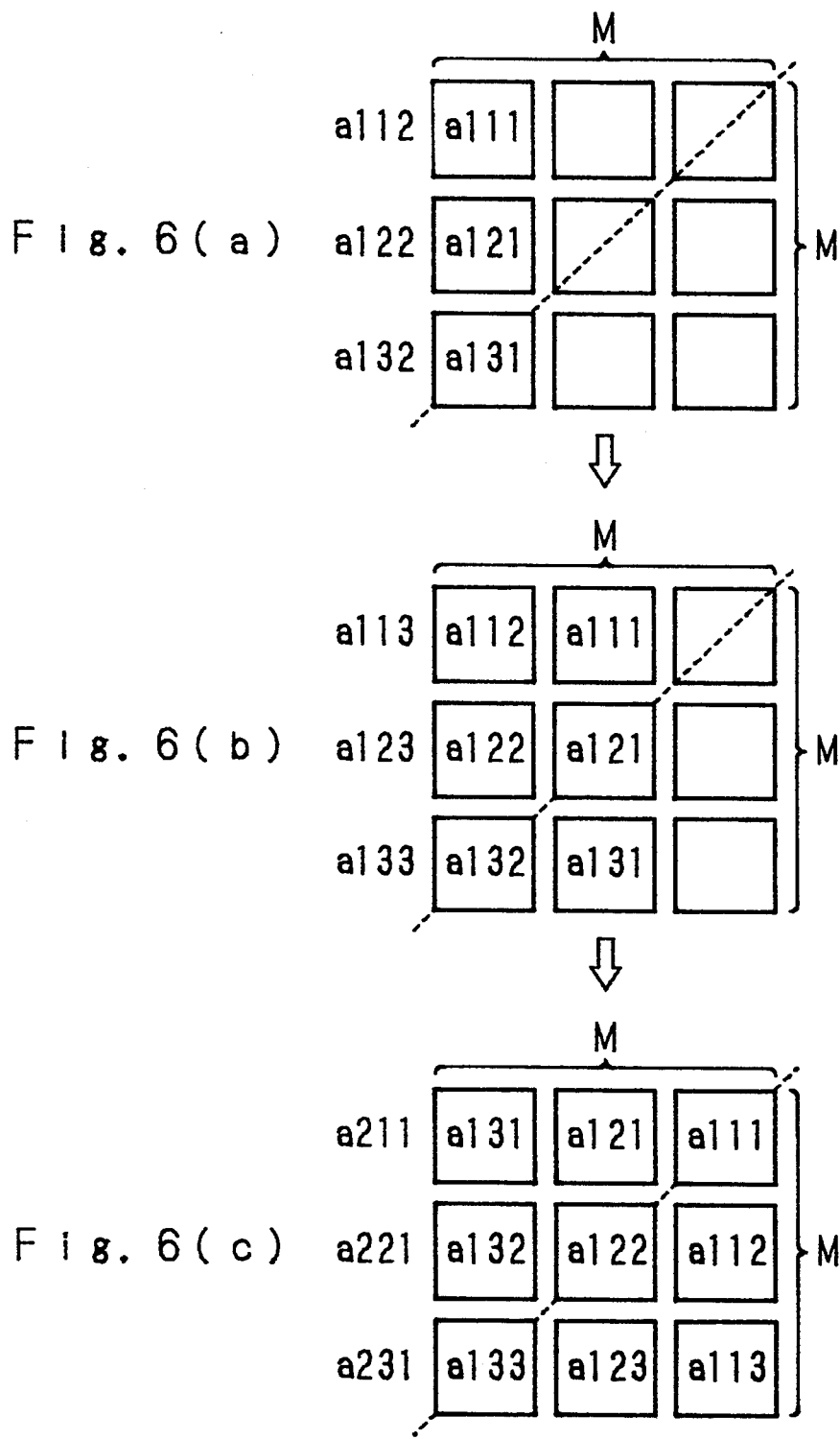

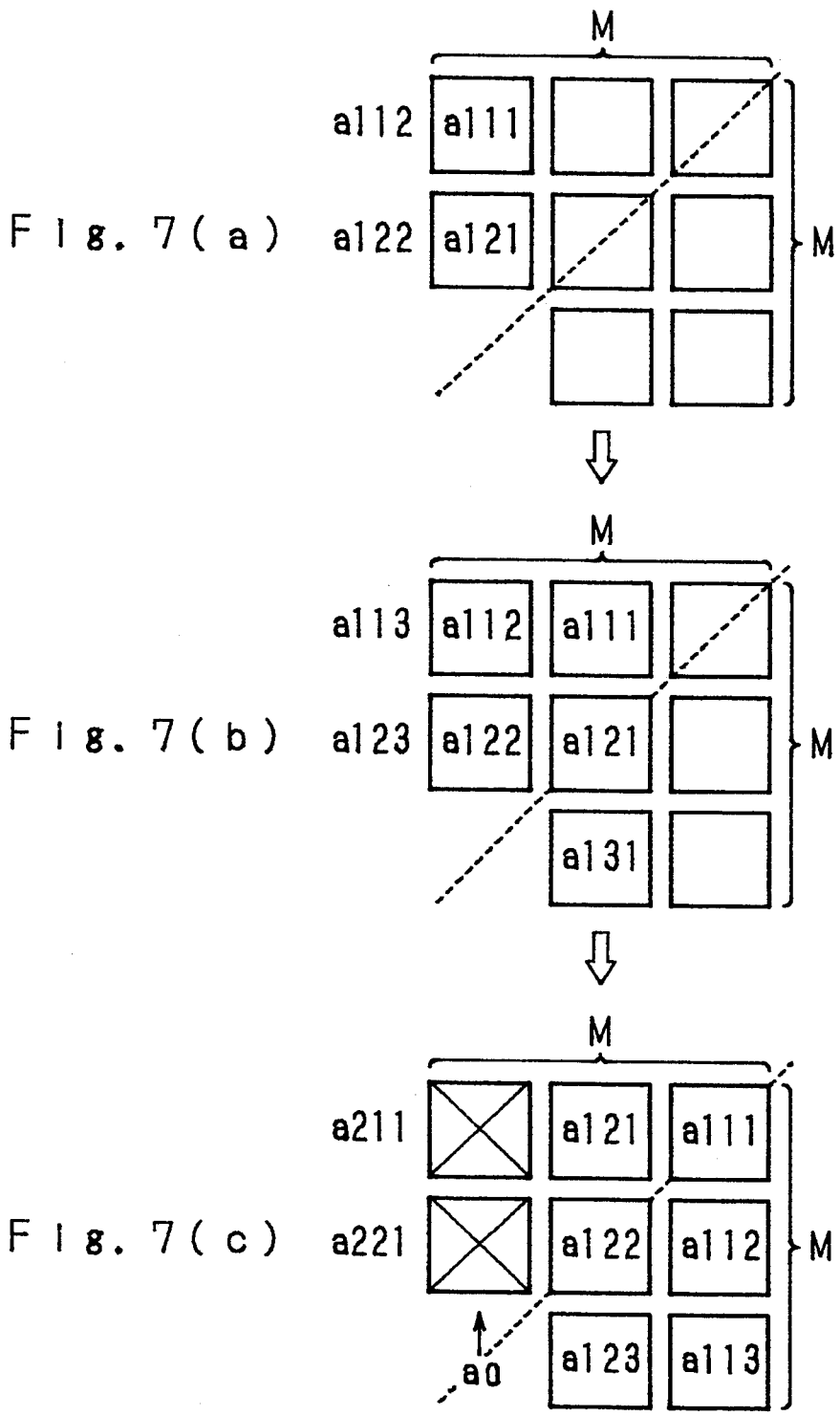
a0: INVALID DATA

Fig. 10(a), 10(b), 10(c), 10(d), 10(e)

CONVERTING METHOD OF VERTICAL DATA/HORIZONTAL DATA AND A CIRCUIT THEREFOR

BACKGROUND OF THE INVENTION

1. Field of the Invention

The present invention relates to a converting method of vertical data/horizontal data used in a field of data communication and a circuit use in conversion.

2. Description of the Relevant Art

In a field of data communication, conversions of vertical data/horizontal data are performed in parity operation, parity error check, data multiplexing and data separation of time slot interchange.

FIG. 1 is a block diagram of a conventional vertical data/horizontal data converting circuit and FIG. 2 is timing charts thereof. In FIG. 2, the vertical bit number N of data to be converted is 2 and the horizontal bit number M is 3.

Bit serial data a(1) is inputted to a shift register 10 in synchronism with a clock CK and shifted sequentially. Every time M-bit data are inputted, the M-bit data Q(1) to Q(M) are inputted to an M-bit flip-flop 20. SP represents a timing signal of data set to the flip-flop 20. The output of the flip-flop 20 is M-bit parallel data converted from input serial data. The parallel data is inputted to a selector 300. Serial parallel converting circuits having the same configuration are provided by the number N for every input lines, and the parallel conversion data of input data a(2) to a (N) are inputted to the selector 300. ST represents a select signal of the selector 300, and data of N number of flip-flop 20 are selected and outputted sequentially from the selector 300 in synchronism with the select signal ST.

Operation of this circuit is described in detail. In FIG. 2, input data a(1) and a(2) are specified by "a" and three subscripts such as aXYZ. X represents bit serial data frame number, Y represents line number (N=1, 2) and Z represents data number (M=1, 2, 3) in the same frame.

Since such input data a(1), a(2) which are to be regarded as horizontal data are sequentially inputted to the shift register 10 by the clock CK, contents of the M=3-bit shift register 10 change as FIGS. 2(a), (b). Since the timing signal SP is given at the rate of one pulse in every three pulses of the clock CK, contents of the 3-bit flip-flop 20 change as FIGS. 2(c), (d). Then, it is time-division multiplexed into the vertical data shown in FIG. 2(c) by the select signal ST which is synchronous with the clock CK.

FIG. 3 shows a vertical data/horizontal data converting circuit disclosed in the Japanese Patent Application No. Sho 61-20431. The circuit comprises a latch matrix 400 consisting of latches 40p which are of same number as that of the vertical data × horizontal data. The vertical (or horizontal) data to be converted are latched by the latch matrix 400. The latch data are read out into a circuit network 500 by giving address signals of the latches 40p in a predetermined sequence. Data are arranged in the circuit network 500 so as to enable required conversions.

In the circuit shown in FIG. 1, M units of flip-flops are necessary for the shift register 10. The flip-flop 20 is also necessary for M bits. Thus, 2 MN units of flip-flops are necessary in total, the fact resulting in a complicated circuit configuration.

On the circuit shown in FIG. 3, since data to be converted which have been latched temporarily by the latch matrix 400 are read out sequentially, the succeeding data input must be queued during this period. Thus, continuous processing is not possible. The circuit network 500 for arranging the read data is also necessary, the fact resulting in a complicated circuit.

SUMMARY OF THE INVENTION

The present invention has been devised to solve such defects of a conventional circuit. According to a method and circuit of the present invention, continuous processings are possible. Also, the circuit can be constituted by a small number of flip-flops, thus the circuit is not complicated and the cost can be reduced.

A converting method of the present invention is based upon the following concept.

Assuming that data group to be converted is horizontally M bits and vertically N bits, and is represented by aYZ.

Where,

Y: vertical number of data group
Z: horizontal number of data group

This data group is arranged and converted into the horizontal N-bit data group and the vertical M-bit data group. First, a square matrix ($M \times M$, or $N \times N$) of M or N whichever the larger is assumed.

At the stage where the data group aYZ is arranged, conversion of the vertical data/horizontal data is performed. This conversion is to transpose positions of respective data against a diagonal axis of the matrix as an axis of symmetry. That is, data at a position (i, j) in the matrix before conversion is transferred to a position (J, i) in the matrix after conversion.

Thereby, the vertical data is converted into the horizontal data. The horizontal data is converted into the vertical data exactly in the same manner.

FIG. 4 illustrates the same. FIG. 4(a) shows the case of M=N (=5), FIG. 4(b) shows the case of M<N (M=3, N=5) and FIG. 4(c) shows the case of M>N (M=5, N=3).

In the cases of FIGS. 4(a) and (c), M-bit data are packed up horizontally. Thus, the diagonal axis is a line connecting the positions of Y=Z. And hence, the transposition corresponds to transfer to the matrix position where Z is the raw number and Y is the column number. Thus, data of Y=Z such as all, a22 . . . are in the same position. On the contrary, a12 is transposed from the position of raw number 1 and column number 2 to the position of column number 1 and raw number 2.

In the case of FIG. 4(b), the conversion takes place when data are arranged in three rows horizontally. Thus, it is not the conversion of Y→Z and Z→Y as in the case of FIGS. 4(a) and (c).

Though the square matrix of $M \times M$ or $N \times N$ is assumed in the above-mentioned description, as it is understood from FIGS. 4(b) and (c), a latch circuit corresponding to the position which is not used before and after the conversion is not necessary. The number of necessary latch circuits is, as shown in FIG. 5(a), $M \times N + M \times (N-M)$ in the case of N>M {corresponding to the case of FIG. 4(b)}, and as shown in FIG. 5(b), $M \times N + N \times (M-N)$ in the case of M>N {corresponding to the case of FIG. 4(c)}.

A part of data to be transposed may be latched directly by the latch circuit corresponding to the position after the conversion without being latched by the latch circuit of the matrix.

FIG. 6 is a view for explaining this state by serial data of M=N=3. As shown in FIG. 6(a), a111 to a131 are latched and as shown in FIG. 6(b), a112 to a132 are inputted, thereby a 1-bit shift and latching of new input data take place.

Then, data a113, a123 inputted next are latched not in the position (i,J)=(1,3), (2,3), but as shown in FIG. 6(c), latched directly in the position (3,1), (3,2) after the transposition a133 is latched in the ordinary position. Though a111 and a122 are shifted by one bit, the other data are transferred to the transposed positions. a211 to a231 are data of the next frame which are to be inputted to the latch matrix.

In order to realize the above-mentioned latches, selectors are provided at the input side of required latch circuits of the matrices.

FIG. 7 is a view for explaining serial data of M=3, N=2. As shown in FIG. 7(a), a111, and a121 are latched, and as shown in FIG. 7(b), a112 and a122 are inputted, thereby a 1-bit shift and latching of new input data take place.

Then, data a113, a123 inputted next are latched not in the position (i,j)=(1,3), (2,3), but latched directly in the position (3,1), (3,2) after the transposition as shown in FIG. 7(c). a211 and a221 are data of the next frame which are to be inputted to the latch matrix.

In order to realize the above-mentioned latches, selectors are provided at the input fore-stage of required latch circuits of the matrices.

FIG. 8 is a view for explaining serial data of M=2, N=3. As shown in FIG. 8(a), a111 and a131 are inputted. Then, as shown in FIG. 8(b), a111 and a131 are transferred to the latch circuits at the transposed position. Thus, the selector is also necessary at this place. a121 is shifted as it is. New input data a112, a122 are latched directly in the transposed position. New input data a132 is latched in the original position. Next, invalid data is latched as shown in FIG. 8(c). Data after the vertical data/horizontal data conversion are outputted from the latch circuits. Thereafter, data of the next frame is latched as shown in FIG. 8(d). The above and further objects and features of the invention will more fully be apparent from the following detailed description with accompanying drawings.

DESCRIPTION OF THE PREFERRED EMBODIMENTS

In the following, the present invention is described in detail on the basis of the drawings showing the embodiments thereof.

Figure 1:
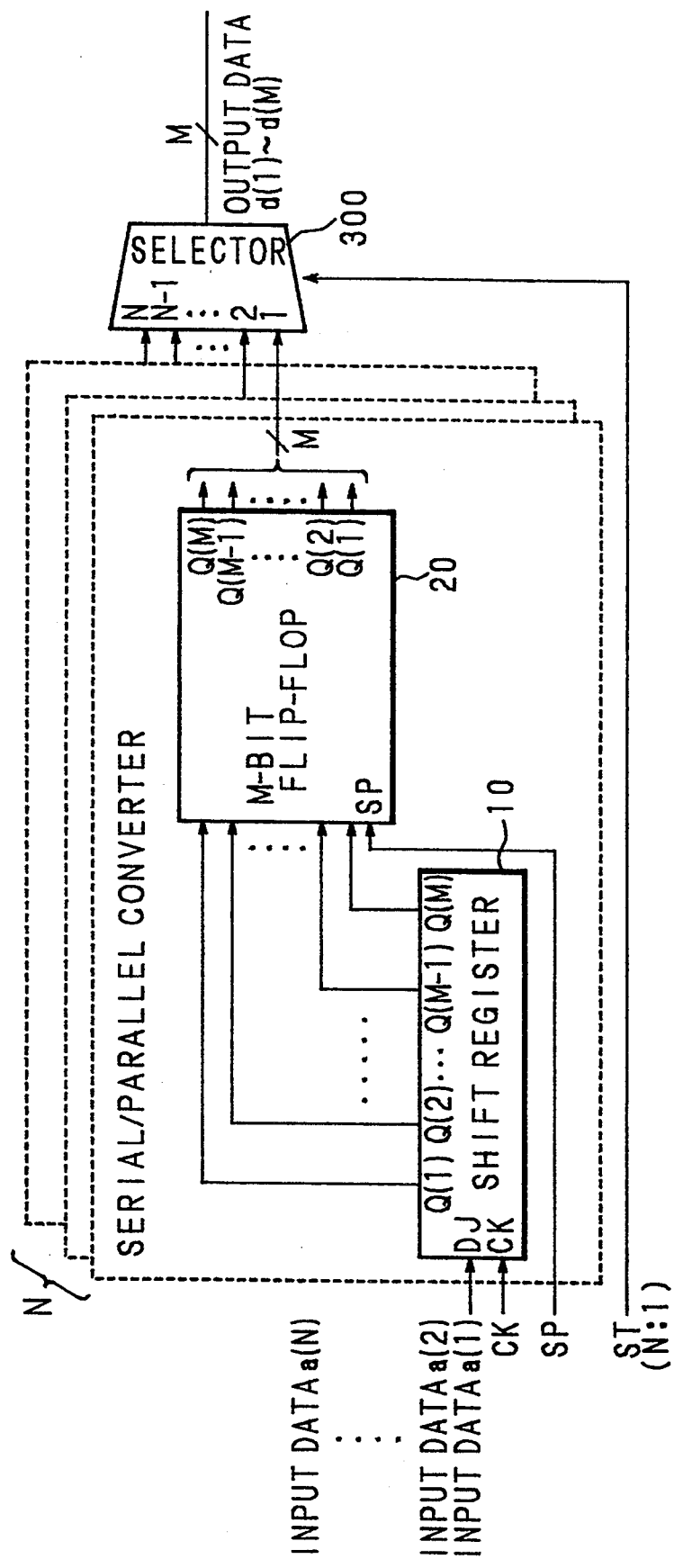
FIG. 1 is a block diagram of a conventional vertical data/horizontal data converting circuit, FIGS. 2(a-e) are timing charts thereof.
Figure 3:
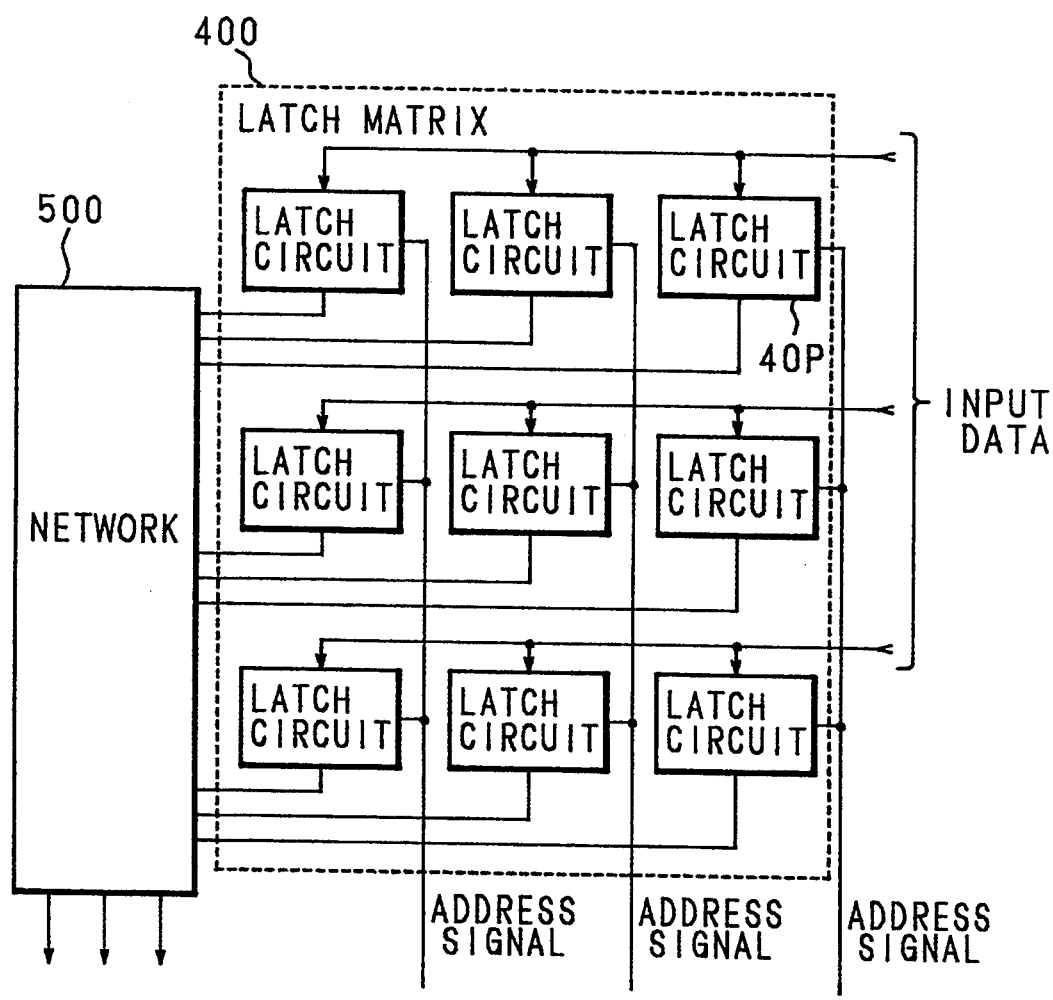
FIG. 3 is a block diagram of a conventional vertical data/horizontal data converting circuit, FIGS. 4(a-c), 5(a-b), 6(a-c), 7(a-c) and 8(a-d) are views for explaining the principle of the present invention.
Figure 4A:
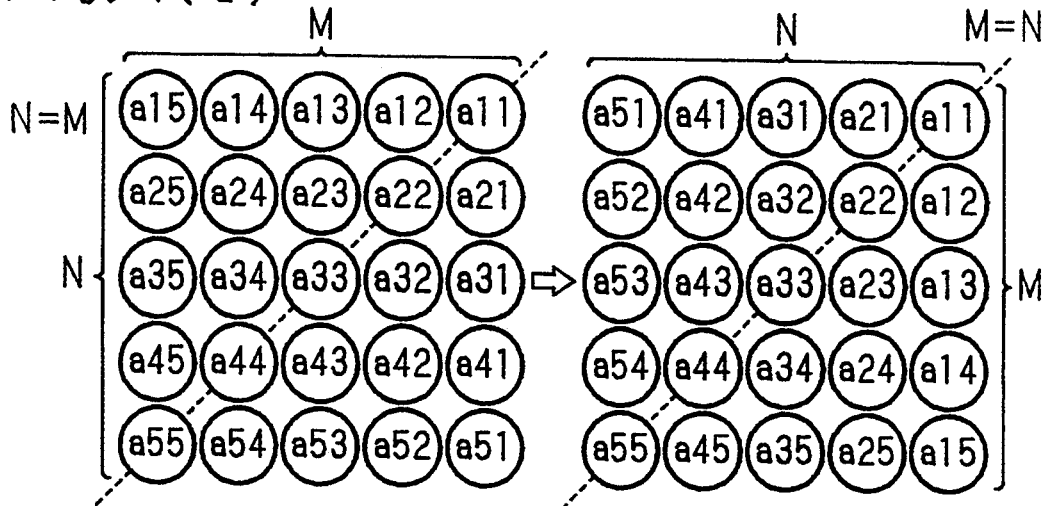
Figure 4B:
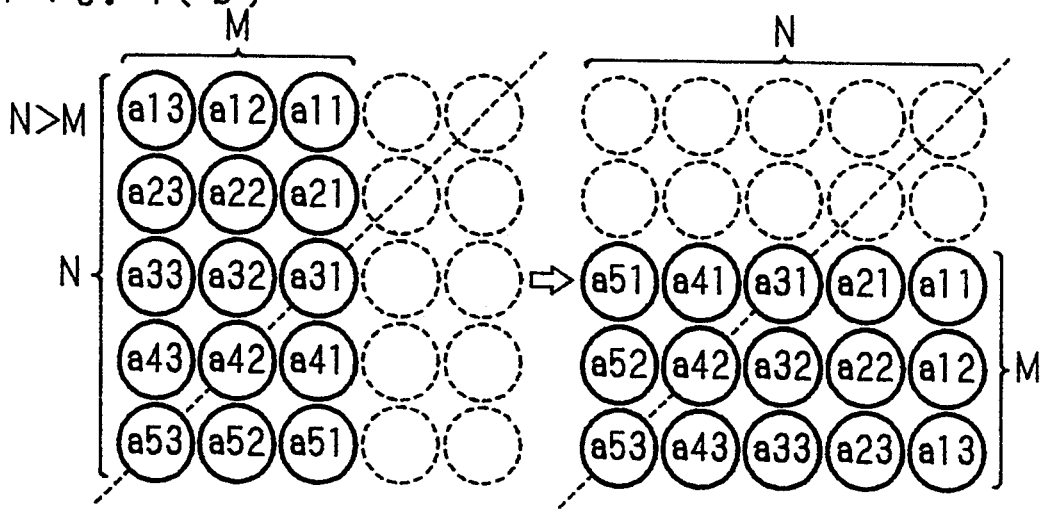
Figure 4C:
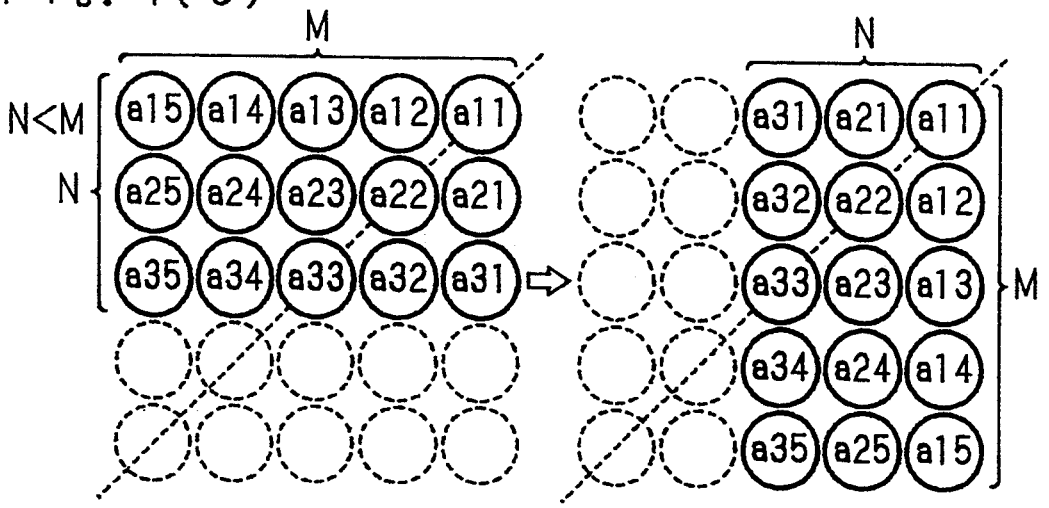
Figure 5A:
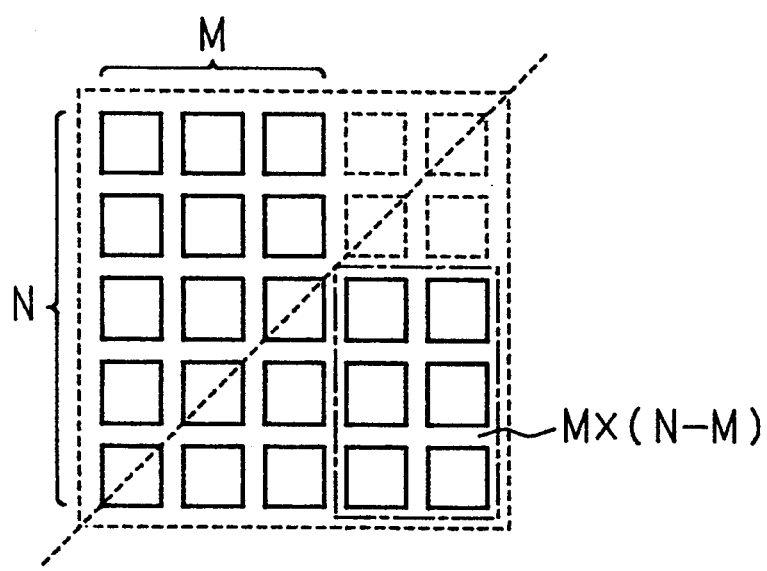
Figure 5B:
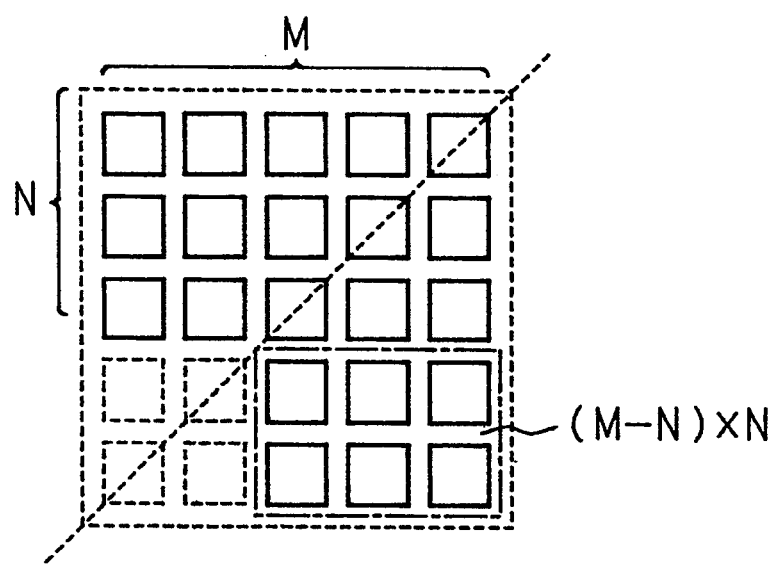
Figure 8A:
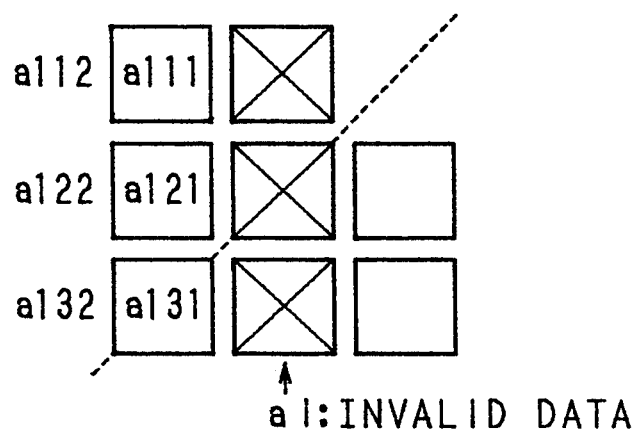
Figure 8B:
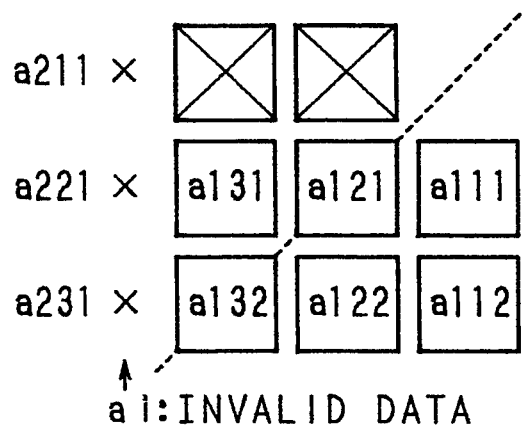
Figure 8C:
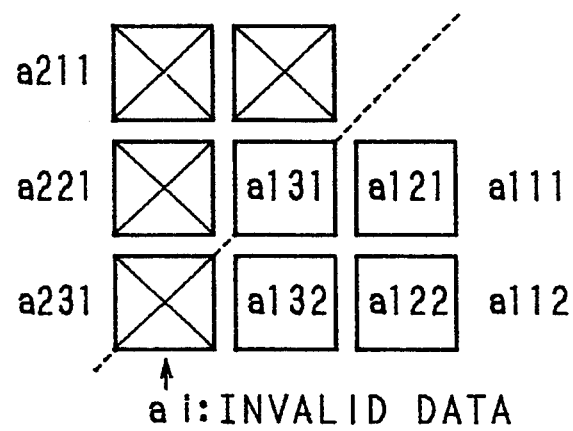
Figure 8D:
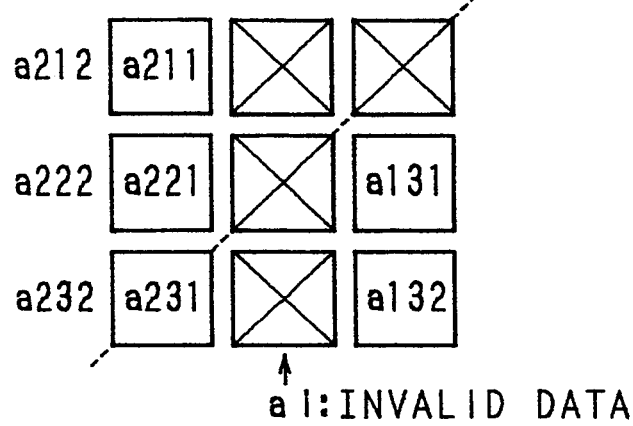
Figure 9:
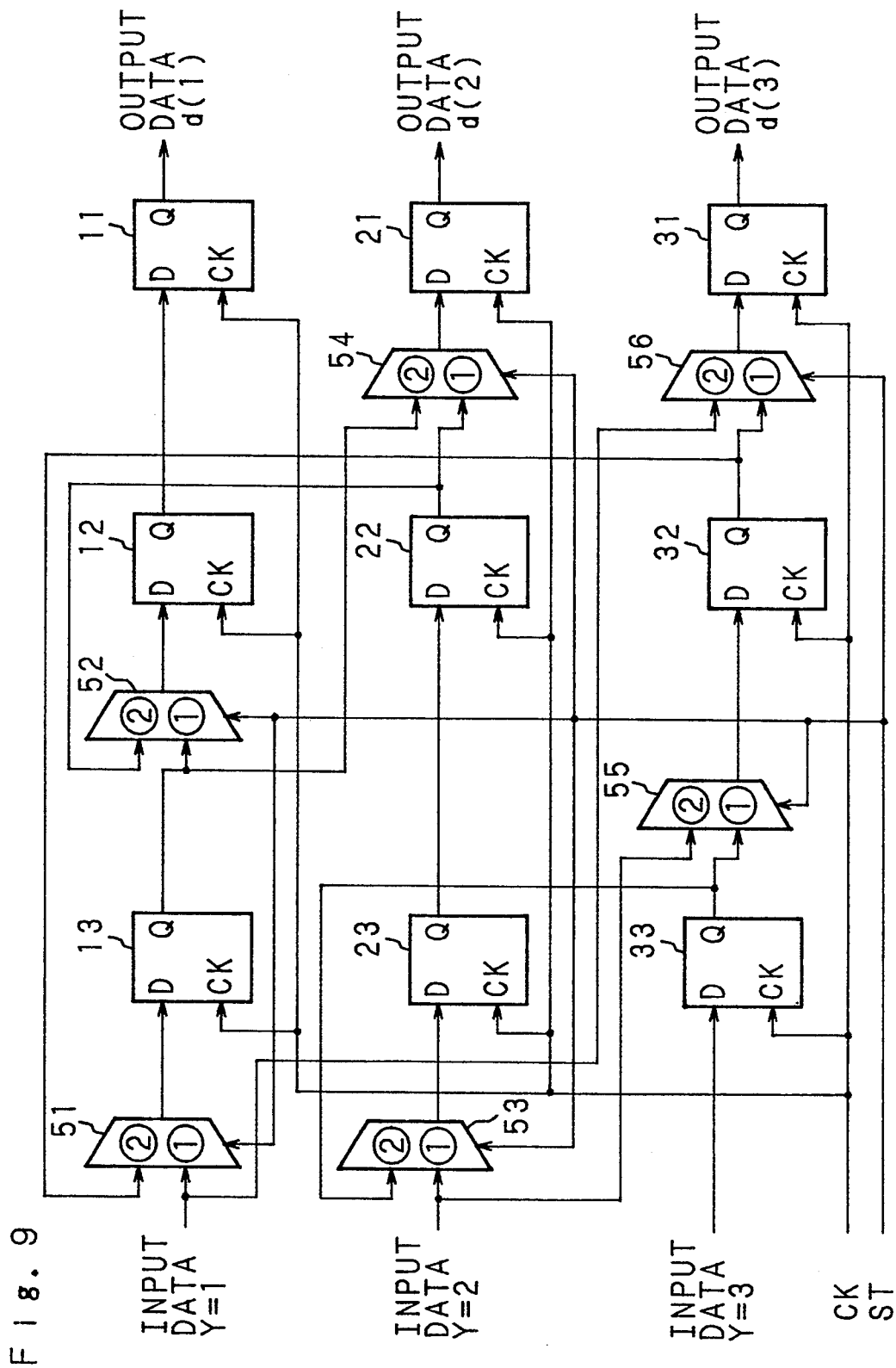
FIG. 9 is a block diagram of a vertical data/horizontal data converting circuit of the present invention, FIGS. 10(a-e) are timing charts thereof.

FIG. 9 is a block diagram of one embodiment of a vertical data/horizontal data converting circuit of the present invention. The embodiment shows the case of M=N=3, and corresponds to FIG. 6. Thus, nine latch circuits using D-flip-flops are necessary.

Data of the vertical number Y=1 serves as a first input of a selector 51 and a second input of a selector 56. The output of the selector 51 is inputted to a latch circuit 13. The output of the latch circuit 13 serves as a first input of a selector 52 and a second input of a selector 54. The output of the selector 52 is inputted to a latch circuit 12. The output of the latch circuit 12 is inputted to a latch circuit 11. The output of the latch circuit 11 is data d(1) which has been converted vertically/horizontally.

Data of the vertical number Y=2 serves as a first input of a selector 53 and a second input of a selector 55. The output of the selector 53 is inputted to a latch circuit 23. The output of the latch circuit 23 is inputted to a latch circuit 22. The output of the latch circuit 22 serves as a first input of the selector 54 and a second input of a selector 52. The output of the selector 54 is inputted to a latch circuit 21. The output of the latch circuit 21 is data d(2) which has been converted vertically/horizontally.

Data of the vertical number Y=3 is inputted to a latch circuit 33. The output of the latch circuit 33 serves as a first input of the selector 55 and a second input of the selector 53. The output of the selector 55 is inputted to a latch circuit 32. The output of the latch circuit 32 serves as a first input of the selector 56 and a second input of the selector 51. The output of the selector 56 is inputted to a latch circuit 31. The output of the latch circuit 31 is data d(3) which has been converted vertically/horizontally.

Figures 10A, 10B, 10C, 10D, 10E:
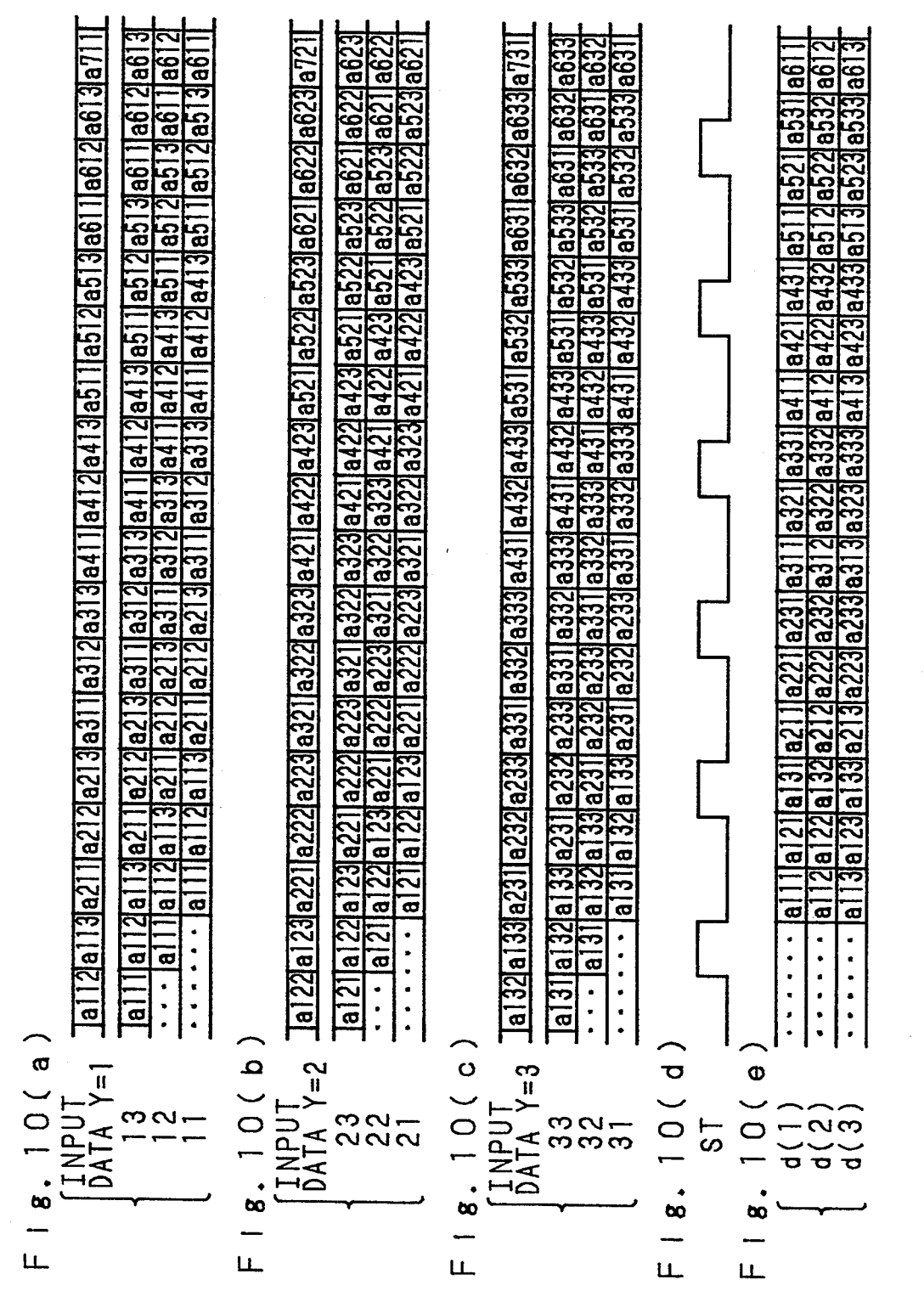

FIG. 10 shows timing charts of the circuit. Data aXYZ are inputted sequentially as shown at respective top portions of FIGS. 10(a), (b), (c).

A clock CK which synchronizes with the input period of data aXYZ is given to the latch circuits 11 to 33. Thereby, the data aXYZ are sequentially latched in the latch circuits 11 to 33 as shown in FIGS. 10(a), (b), (c).

A select signal ST which becomes a high level in accordance with the input timing of data Z=3 is given to the selectors 51 to 56 at the rate of one pulse in every three pulses of the clock CK {FIG. 10(d)}. The selectors 51 to 56 select the second input at the high-level timing and the first input at the low-level timing. Thus, data are transposed as shown in FIG. 6, and data which are converted vertically/horizontally as shown in FIG. 10(e) are obtained.

Figure 11:
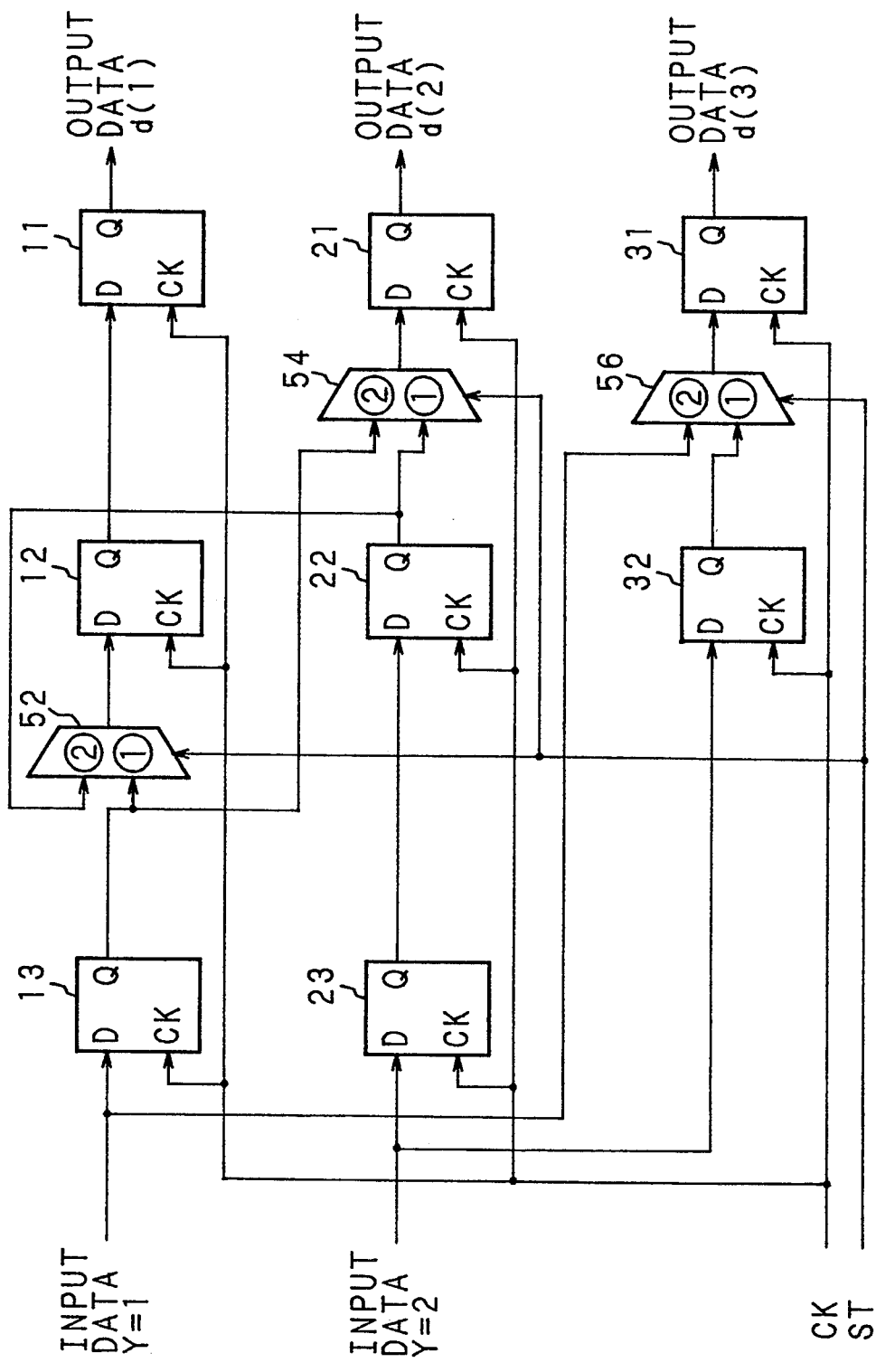
FIG. 11 is a block diagram of another vertical data/horizontal data converting circuit of the present invention, and FIGS. 12(a-e) are timing charts thereof.

In the embodiment shown in FIG. 9, though the selectors are provided at the respective input sides of all of the latch circuits other than those positioned on the diagonal axis of the matrix, in the case of M≠N, there may be a latch circuit which has no selector. FIG. 11 is a block diagram of another embodiment of a vertical data/horizontal data converting circuit of the present invention. The embodiment shows the case of M=3 and N=2 and corresponds to FIG. 7. Thus, eight latch circuits using the D-flip-flops are necessary.

Data of the vertical number Y=1 is inputted to the latch circuit 13, and the output of which serves as a first input of the selector 52 and a second input of the selector 54. The output of the selector 52 is inputted to the latch circuit 12. The output of the latch circuit 12 is inputted to the latch circuit 11. The output of the latch circuit 11 is data d(1) which has been converted vertically/horizontally.

Data of the vertical number Y=2 is inputted to the latch circuits 23, 32. The output of the latch circuit 23 is inputted to the latch circuit 22. The output of the latch circuit 22 serves as a first input of the selector 54 and a second input of the selector 52. The output of the selector 54 is inputted to the latch circuit 21. The output of the latch circuit 21 is data d(2) which has been converted vertically/horizontally.

The output of the latch circuit 32 serves as a first input of the selector 56. The output of the selector 56 is inputted to the latch circuit 31. The output of the latch circuit 31 is data d(3) which has been converted vertically/horizontally.

FIG. 12 shows timing charts of the circuit. Data aXYZ are inputted sequentially as shown at respective top portions of FIGS. 12(a), (b).

A clock CK which synchronizes with the input period of data aXYZ is given to the latch circuits 11 to 32. Thereby, the data aXYZ are sequentially latched in the latch circuits 11 to 32 as shown in FIGS. 12(a), (b), (d).

A select signal ST which becomes a high level in accordance with the input timing of data Z=3 is given to the selectors 51 to 56 at the rate of one pulse in every three pulses of the clock CK {FIG. 12 (c)}. The selectors 52, 54, 56 select the second input at the high-level timing and the first input at the low-level timing. Thus, data are transposed as shown in FIG. 7, and data converted vertically/horizontally as shown in FIG. 12(e) are obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A vertical data/horizontal data converting circuit which arranges and converts a data group to be arranged in M bits horizontally and in N bits vertically, into N bits horizontally and into M bits vertically, comprising:

a latch matrix consisting of latch circuits of $\{M \times N + M \times (N-M)$ units$\}$ or $\{M \times N + N \times (M-N)$ units$\}$ including specific latch circuits which can be recognized as arranged symmetrically with respect to one diagonal axis of a square matrix which is square of M or N whichever the larger and other latch circuits recognized as positioned on said diagonal axis, said latch circuits being connected to enable data transmission horizontally or vertically, and a plurality of selectors provided at the input sides of at least some of said specific latch circuits, respectively, said selectors applying to respective specific latch circuits associated therewith an input of said latch matrix or an output of a latch circuit positioned upstream of a respective selector in a direction Of data transmission in the data converting circuit so that data is selectively inputted to each specific latch circuit which is arranged symmetrically to another specific circuit with respect to said diagonal axis.

2. A vertical data horizontal data converting circuit as set forth in claim 1, wherein said selectors select said data once in every M times to input said data to said specific latch circuits.

3. A vertical data/horizontal data converting circuit as set forth in claim 1, wherein said selectors are provided at the input sides of all of said specific latch circuits.

* * * * *